No. 674,447. Patented May 21, 1901.
F. W. MASE.
GEARING.
(Application filed Aug. 23, 1900.)
(No Model.)
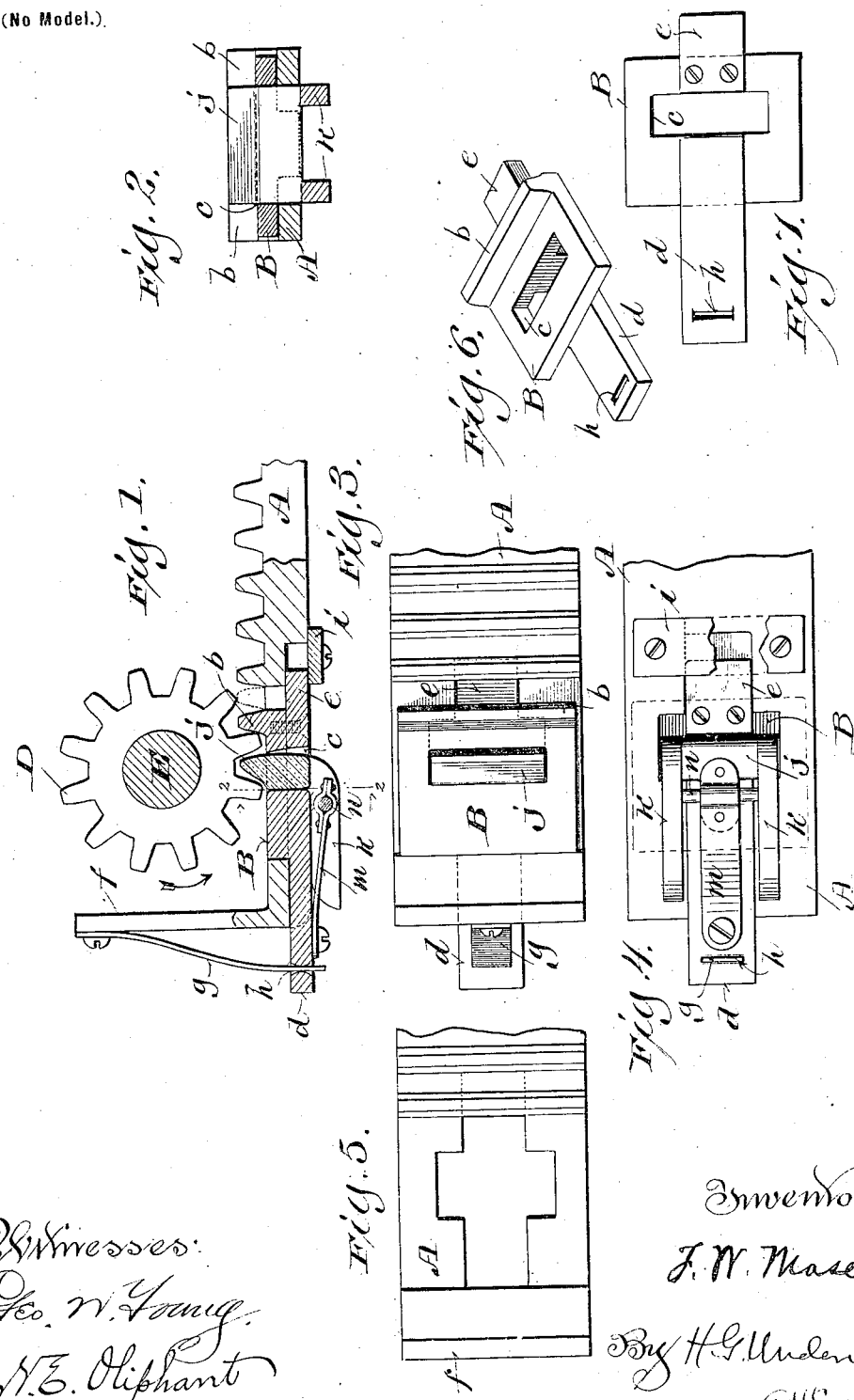

UNITED STATES PATENT OFFICE.

FREDERICK W. MASE, OF OSHKOSH, WISCONSIN, ASSIGNOR OF ONE-HALF TO PETER C. HENNINGSON, OF LAKEMILLS, WISCONSIN.

GEARING.

SPECIFICATION forming part of Letters Patent No. 674,447, dated May 21, 1901.

Application filed August 23, 1900. Serial No. 27,763. (No model.)

*To all whom it may concern:*

Be it known that I, FREDERICK W. MASE, a citizen of the United States, and a resident of Oshkosh, in the county of Winnebago and State of Wisconsin, have invented certain new and useful Improvements in Gearing; and I do hereby declare that the following is a full, clear, and exact description thereof.

My invention has for its object to provide simple economical gearing especially designed for use in connection with bascule-bridge trucks, but which may be variously applied to effect an automatic predetermined stop of machinery even though the driver for same continues in motion and which will readily coact with said driver when the latter is reversed.

Therefore said invention consists in certain peculiarities of construction and combination of parts hereinafter particularly set forth with reference to the accompanying drawings and subsequently claimed.

Figure 1 of the drawings represents a partly-sectional longitudinal elevation of an assemblage of parts embodied in my improved gearing; Fig. 2, a detail transverse section indicated by line 2 2 in the first figure; Fig. 3, a plan view of a portion of a rack embodied in the gearing; Fig. 4, a similar view of the same inverted; Fig. 5, another plan view of the said portion of the rack from which movable parts of the same have been detached; Fig. 6, a detail perspective view of a slide-section of said rack, and Fig. 7 a plan view of the slide-section inverted.

Referring by letter to the drawings, A indicates a rack having a section thereof in the form of a slide B, provided with a cog $b$,-mortise $c$, and under-side tongues $d$ $e$, these tongues being loose in guideways in the rack-bar longitudinally of the same. Fast on a right-angle end flange $f$ of the rack-bar is a strut-spring $g$, that engages a transverse slot $h$, adjacent to the outer end of slide-tongue $d$, and slide-tongue $e$ is supported on a plate $i$, made fast to the rack-bar transversely of the same. Loose in mortise $c$ of slide B is a cog $j$, having parallel rocker-pointed arms $k$ extending under said slide. A strut-spring $m$ connects the slide with a bar $n$, that joins the aforesaid rocker-pointed cog-arms.

The play of slide B is equal to the width of an interval between fixed cogs of the rack, and cog $b$ on said slide is arranged to be normally a distance equal to the slide play from a terminal one of said fixed cogs. Cog $j$ is a like distance from cog $b$, and one side of said cog $j$ is preferably more beveled than the other, as is herein shown.

A spur-pinion D, fast on a power-shaft E, is arranged to operate in conjunction with the rack, and in practice when the pinion is passed by the fixed cogs of the rack it will operate on cog $b$ to move the slide B against resistance of spring $g$ toward the adjacent fixed cog, at the same time depressing spring-controlled cog $j$ to eventually clear the same, the greater bevel of one side of the latter cog facilitating the operation. A tooth of the pinion passing out of contact with cog $b$, retraction of spring $g$ will return slide B to normal position, and said cog, as well as the one $j$, will again engage said pinion. Therefore as long as the pinion continues in rotation after passing the fixed cogs of the rack there will be continued reciprocation of slide B with cog $b$ and oscillation of cog $j$ to prevent injury to the gearing. Rotation of the pinion being reversed, engagement of the cogs $b$ $j$ with said pinion will result in an immediate corresponding movement of the rack.

While the employment of the oscillative cog $j$ is preferred in order to facilitate the reverse motion of the rack, it is practical to omit said cog and yet attain the object of my invention.

The slide mechanism and the oscillative cog will be duplicated at the other end of the rack whenever occasion may demand.

Having thus described my invention, what I claim as new, and desire to secure by Letters Patent, is—

1. A rack having a spring-controlled cog movable longitudinally thereof and a spring-controlled oscillative cog in juxtaposition to the one aforesaid, together with a rack-engaging spur-pinion operative in one direction of rotation to propel the first of said cogs against its spring resistance and depress the other of said cogs against like resistance, whereby both the aforesaid cogs are eventually cleared by the pinion and automatically returned to normal position from time to time as long as said pinion continues to operate in the aforesaid direction.

2. A rack having a spring-controlled slide-section provided with a cog, the play of the slide being equal to the width of an interval between fixed cogs of the rack, and a spur-pinion engageable with said rack to operate in one direction of rotation upon the cog on the slide to move said slide its limit of play against spring resistance.

3. A rack having a spring-controlled slide-section provided with a mortise and cog, the play of the slide being equal to the width of an interval between fixed cogs of the rack, a spring-controlled oscillative cog extending through the slide-mortise, and a spur-pinion engageable with said rack to operate in one direction of rotation upon the cog on the slide and the oscillative cog to move said slide its limit of play against spring resistance and to retract the oscillative cog against like resistance.

4. A rack having a terminal flange and a slide-section provided with a cog, tongues on the slide engaging guideways in the rack-bar, a spring connecting the terminal flange of said rack-bar with a slide-tongue, and a rack-engaging spur-pinion operative in one direction of rotation upon the cog on the slide to move said slide against resistance of the spring.

5. A rack having a terminal flange, as well as a slide-section provided with a cog, a mortise and tongues, which tongues engage guideways in the rack-bar; a spring connecting the terminal flange of said rack-bar with one of the slide-tongues, another cog loose in the slide-mortise but having spring-controlled rocker connection with the aforesaid rack-bar, and a rack-engaging spur-pinion operative in one direction of rotation to shift the slide simultaneous with a retraction of the cog engaging its mortise.

In testimony that I claim the foregoing I have hereunto set my hand, at Milwaukee, in the county of Milwaukee and State of Wisconsin, in the presence of two witnesses.

FREDERICK W. MASE.

Witnesses:
N. E. OLIPHANT,
B. C. ROLOFF.